United States Patent
Koch

(10) Patent No.: US 10,834,912 B2
(45) Date of Patent: Nov. 17, 2020

(54) PRODUCTION METHOD OF FISH BAITS AND FISH BAITS ACCORDING TO THIS PRODUCTION METHOD

(71) Applicant: Hansjörg Koch, Wohlen (CH)

(72) Inventor: Hansjörg Koch, Wohlen (CH)

( * ) Notice: Subject to any disclaimer, the term of this patent is extended or adjusted under 35 U.S.C. 154(b) by 4 days.

(21) Appl. No.: 16/348,925

(22) PCT Filed: Oct. 26, 2017

(86) PCT No.: PCT/IB2017/056656
§ 371 (c)(1),
(2) Date: May 10, 2019

(87) PCT Pub. No.: WO2018/087620
PCT Pub. Date: May 17, 2018

(65) Prior Publication Data
US 2019/0274294 A1    Sep. 12, 2019

(30) Foreign Application Priority Data

Nov. 14, 2016   (CH) ........................................ 1501/16

(51) Int. Cl.
*A01K 97/04*         (2006.01)
*A01K 85/00*         (2006.01)

(52) U.S. Cl.
CPC ............ *A01K 97/045* (2013.01); *A01K 85/00* (2013.01)

(58) Field of Classification Search
None
See application file for complete search history.

(56) References Cited

U.S. PATENT DOCUMENTS 2,582,646 A * 1/1952 Moore .................. A01K 83/06
                                                           43/42.48
3,820,269 A   6/1974 Rae
(Continued)

FOREIGN PATENT DOCUMENTS

CA        2461939 A1 *  4/2005
EP     0 852 992 B1     4/2004
(Continued)

OTHER PUBLICATIONS

International Search Report for International Application No. PCT/IB2017/056656 dated Feb. 21, 2018.
(Continued)

*Primary Examiner* — C. Sayala
(74) *Attorney, Agent, or Firm* — Lathrop GPM LLP

(57) ABSTRACT

The invention relates to a novel method for producing fish bait, in which fish are dehydrated and then impregnated. In a first step, fresh dead fish bodies are attached and suspended on a horizontal carrier in the longitudinal direction and then frozen in a deep freezer. In a second step, the frozen fish bodies are impregnated in deep-frozen acetone and dewatered. In a third step, the acetone is brought to room temperature in order to defat the fish bodies. In a forth step, the fish bodies are impregnated in a vacuum chamber, the acetone being replaced by a suitable impregnating means for a plurality of days under a vacuum. And in a fifth step, the fish bodies impregnated with the impregnating means are hardened at room temperature.

12 Claims, 2 Drawing Sheets

(56) References Cited

U.S. PATENT DOCUMENTS

| | | | | |
|---|---|---|---|---|
| 4,160,847 A | * | 7/1979 | Orth, Jr. | A23K 50/80 |
| | | | | 426/1 |
| 5,173,316 A | | 12/1992 | Heycott | |
| 5,776,523 A | * | 7/1998 | Axelrod | A23B 4/20 |
| | | | | 426/1 |
| 2002/0142067 A1 | * | 10/2002 | Hanson | A23K 50/80 |
| | | | | 426/1 |

FOREIGN PATENT DOCUMENTS

| | | | |
|---|---|---|---|
| GB | 443400 A | | 2/1936 |
| JP | 53112195 A | * | 9/1978 |
| JP | 2005-60361 A | | 3/2005 |

OTHER PUBLICATIONS

German Written Opinion for International Application No. PCT/IB2017/056656 dated Feb. 21, 2018 and its English translation.

* cited by examiner

PRODUCTION METHOD OF FISH BAITS AND FISH BAITS ACCORDING TO THIS PRODUCTION METHOD

CROSS-REFERENCE TO RELATED APPLICATIONS

This application is a National Stage application of International Patent Application No. PCT/IB2017/056656 filed Oct. 26, 2017, which claims priority to Swiss Patent Application No. 01501/16, filed Nov. 14, 2016, each of which is hereby incorporated by reference in its entirety.

TECHNICAL FIELD OF THE INVENTION

The invention relates to a method for producing fish bait and fish bait manufactured according to such a method.

BACKGROUND OF THE INVENTION

The conservation of organic and inorganic materials is generally known. For example, EP 0 852 992 B1 describes a method in which the material to be preserved is impregnated with a curable composition containing an organosilicon compound or a mixture of organosilicon compounds and then the material is hardened with a catalyst or a mixture of catalysts. A method for the production of fish bait is not described. Only an experiment with small goldfish is described, wherein vacuum treatment is strongly discouraged because the goldfish was too fragile and either broke or split. In a very complex procedure, two goldfish were dehydrated and impregnated, but the results were different.

SUMMARY OF THE INVENTION

The present invention is now based on the object of specifying a method for the production of fish bait, in which fish are dehydrated and then impregnated in order to achieve a uniformly good result.

This object is solved by a method for the production of fish bait, in which fish are dehydrated and then impregnated, wherein, in a first step, fresh dead fish bodies are fixed and suspended in the longitudinal direction on a horizontal carrier and then frozen in a freezer; in a second step, the frozen fish bodies are soaked in deep-frozen acetone and dewatered; in a third step, the acetone is brought to room temperature to defat the fish bodies; in a fourth step, the fish bodies are impregnated in a vacuum chamber by replacing the acetone with a suitable impregnating agent for several days under vacuum; and, in a fifth step, the fish bodies impregnated with the impregnating agent are hardened at room temperature.

The invention has the advantage that the production of fish bait can be carried out in a simpler method and results in a lifelike image of a fish.

BRIEF DESCRIPTION OF THE DRAWINGS

Further advantages of the invention follow from the dependent claims and from the following description, in which the invention is explained in detail by means of an embodiment example shown in the schematic drawings.

DETAILED DESCRIPTION OF PREFERRED EMBODIMENTS

Figure 1:
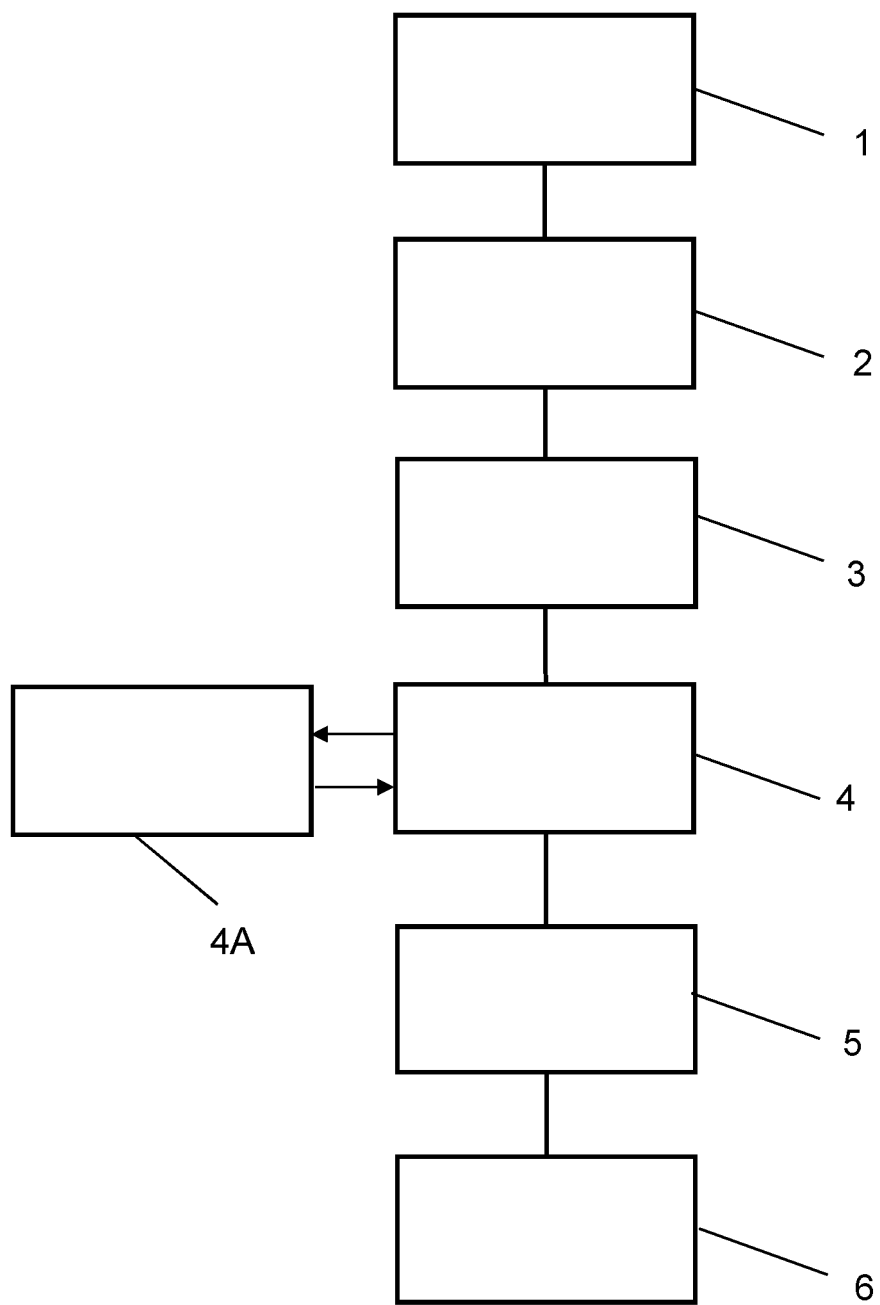
FIG. 1 shows the individual method steps for the production of fish bait.
Figure 2:
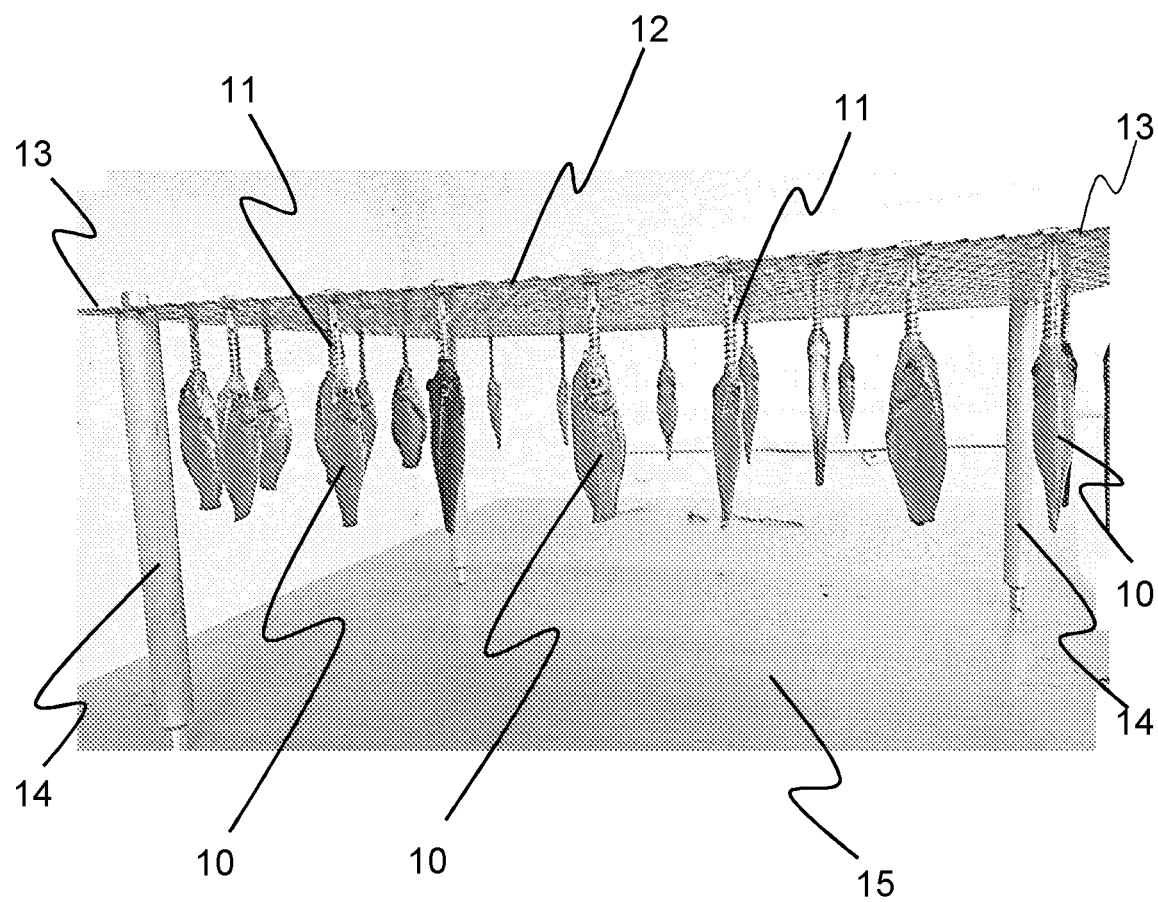
FIG. 2 shows a perforated plate with fish bodies suspended from it.

In a first method step 1 of FIG. 1, freshly caught dead fish bodies 10 (see FIG. 2) are suspended with a screw 11 from a perforated plate intended as a horizontal support 12. For this purpose, the screw 11 is first passed through the perforated plate 12 and then screwed into the mouth of the fish up to the end of the stomach. The perforated plate 12 is supported at the four corners 13 by four supports 14 on a base 15. By gravity and the vertical suspension of the fish body 10 a straight fixation is guaranteed. After the perforated plate 12 has been fitted with the desired number of fish bodies 10, it is placed in a freezer and left there for about two hours until the fish bodies 10 are completely frozen. The screws 11 are then twisted out of the frozen fish bodies 10 and the fish bodies 10 are aligned manually if the shape is not desired. The fish bodies 10 can thus be practically stored as bulk material for the next method step. In addition, the eyes of the frozen fish bodies 10 can be drilled with a micro drill with a diameter of about 0.5 mm. In addition, small openings can be made along the back and abdomen of the fish body 10, as required, to facilitate impregnation.

In the second method step 2, the frozen fish bodies 10 are soaked in deep-frozen acetone and dewatered. For effective dewatering, 50 grams of acetone per 1 gram of fish body 10 by weight are required. The fish bodies 10 are stored in appropriate containers in an explosion-proof freezer at a temperature of minus 20 to minus 30 degrees Celsius, preferably minus 25 degrees Celsius, and are thus dewatered. The body fluid of the fish body 10 and the acetone are exchanged in the direct vicinity of the fish body 10 until the acetone in the container has a water content of less than one percent. The water content is measured with a refractometer.

In the third method step 3, the acetone is brought to room temperature with the fish bodies 10 in order to defat the fish bodies 10. As the fat leaks out, the acetone turns yellowish. This step 3 is completed when no discoloration occurs after the acetone has been replaced.

In the fourth method step 4, the fish bodies 10 are impregnated in a vacuum chamber by replacing the acetone with a suitable impregnating agent under vacuum for several days. The acetone is released in bubble form, while the impregnating agent enters at the same time. The process is continued until no more acetone escapes, after which this method step 4 is completed. This process can take from several days to a week. The impregnation can be carried out as partial impregnation or as full impregnation (see below).

In one variant of the manufacturing method, the complete acetone is extracted from the fish body 10 in a separate step 4A by vacuum and heat. The evaporation of acetone in a vacuum does not cause any wrinkles or visible deformations. Method step 4 is completed when the weight of fish body 10 has not changed after ten hours. The change in weight can be measured with a microbalance. The fish body 10 consists then only of tissue without any fat or liquid. By drying the fish body 10, the effective impregnation of the entire fish tissue only takes about two hours. It is also possible to provide only a partial impregnation without residual pollutants in the tissue, which takes even less time and the fish bait can be produced even more economically.

In the case of partial impregnation according to method step 4, the dried fish bodies 10 are immersed in a container with a random impregnating agent. As with common resins, oils, silicates, lacquers or liquid foams, the fish body 10 must be kept completely in the impregnating agent by mechanical fixation, as otherwise the fish body 10 will float and deform.

The container with the immersed fish bodies 10 is then placed in a vacuum container. Only a slight vacuum of about 50 millibar is generated, for example, to allow the corresponding impregnating liquid to penetrate the fish body 10.

The finished fish bait must meet various requirements, which is why the fish bodies are fully or partially impregnated. The selected vacuum and the selected duration are relevant in this case. This is not possible with conventional prior art full impregnation methods, as otherwise there is residual acetone in the fish body, which can cause hardening problems due to undesirable chemical reactions. Residual materials such as acetone are water-soluble and toxic in water.

The exact parameters can be defined by destruction tests after hardening (see below).

When impregnating the entire fish tissue with an impregnating agent with a higher specific weight than water, the fish body 10 will sink. The partial impregnation of the belly region by exploiting the natural weight distribution of the fish body 10 allows the fish bait to swim with its back to the water surface. It is also possible to use impregnating agents that are lighter than water. This ensures buoyancy. In contrast to full impregnation, impregnating agents with a short pot life can be used for partial impregnation, since no more than about two hours are required. The advantage of a partial impregnation thus ensures a greater variety in the choice of impregnating agents. In addition, metal powder can be added in the large opening from mouth to anus for top-heaviness or for a better floating behavior.

In full impregnation as described in method step 4, the fish bodies 10 are immersed directly from the acetone bath in a container with an impregnating agent that does not trigger any chemical reaction in contact with acetone, wherein the fish bodies 10 are held completely in the impregnating agent by mechanical fixation. The container with the immersed fish bodies 10 is placed in a vacuum container. The processing temperature is different depending on the pot life of the respective impregnating liquids. A vacuum is then created so that acetone and impregnating liquid can be exchanged in the fish bodies 10.

As an example, full impregnation can look as follows:

| Step | Millibar | Time (hours) |
|---|---|---|
| 1 | 30 | 10 |
| 2 | 15 | 10 |
| 3 | 10 | 10 |
| 4 | 5 | 10 |
| 5 | 2 | 10 |
| 6 | (Resting phase without vacuum) | 24 |
| 7 | 2 | Interval 48 hours (3 hours vacuum, 3 hours resting phase) |

The data refer to fish bodies 10 of about 8 cm. Then the fish bodies 10 are stored without vacuum for at least 24 hours in the same liquid to prevent tensions.

In method step 5, the fish bodies 10 soaked with the impregnating agent are hardened at room temperature. For this purpose, the fish bodies 10 are removed from the impregnating liquid after the relaxation phase. Depending on the curing properties, UV light, reaction curing, heat curing or the like are used.

In method step 6, corresponding scoops (not shown) in various sizes and shapes, which are adapted to the opening, can be screwed in through the opening in the area of the mouth to the anus of the fish body. The fish bodies 10 can be equipped with or without scoops, depending on the fishing technique. Depending on the fishing method used, eyelets and fishhooks may then also be attached to the hardened fish body.

While the present invention has been illustrated and described with respect to a particular embodiment thereof, it should be appreciated by those of ordinary skill in the art that various modifications to this invention may be made without departing from the spirit and scope of the present.

What is claimed is:

1. A method for the production of fish bait, in which fish are dehydrated and then impregnated, wherein, in a first step, fresh dead fish bodies are fixed and suspended in the longitudinal direction on a horizontal carrier and then frozen in a freezer, in a second step, the frozen fish bodies are soaked in deep-frozen acetone and dewatered; in a third step, the acetone is brought to room temperature to defat the fish bodies; in a fourth step, the fish bodies are impregnated in a vacuum chamber by replacing the acetone with a suitable impregnating agent for several days under vacuum, and, in a fifth step, the fish bodies impregnated with the impregnating agent are hardened at room temperature.

2. The method according to claim 1, wherein the fixing of the dead fish is carried out in such a way that a screw is twisted through the mouth of the fish body to the end of the fish stomach and the screw is suspended in a horizontal support.

3. The method according to claim 2, wherein the screw is twisted out of the frozen fish body and the fish body is readjusted if it does not have the desired shape.

4. The method according to claim 3, wherein the eyes of the frozen fish body are drilled by means of a microdrill.

5. The method according to claim 4, wherein small openings are made along the back and along the abdominal part of the frozen fish body, which openings promote the impregnation.

6. The method according to claim 1, wherein, in the second step, the acetone is cooled to a temperature of minus 20 to minus 30 degrees Celsius.

7. The method according to claim 1, wherein, in the fourth step, resins, oils, silicates, lacquers or liquid foams are used as impregnating agents.

8. The method according to claim 7, wherein the fish body is held completely in the impregnating agent by a fixation.

9. The method according to claim 1, wherein, in the fifth step, the fish bodies are hardened by means of UV light, reaction hardener or heat.

10. Fish bait produced by a method according to claim 1, wherein a matching scoop is mounted in the hardened fish body in the mouth opening up to the anus of the fish.

11. Fish bait according to claim 10, wherein one or more eyes are attached to the hardened fish body.

12. The method according to claim 6, wherein the acetone is cooled to a temperature around minus 25 degrees Celsius.

* * * * *